United States Patent [19]

Nakano

[11] Patent Number: 5,470,676
[45] Date of Patent: Nov. 28, 1995

[54] LEAD-ACID STORAGE BATTERY CONTAINING POCKET-TYPE ELECTRODE ASSEMBLY

[75] Inventor: Kenji Nakano, Iwaki, Japan

[73] Assignee: Furukawa Denchi Kabushiki Kaisha, Japan

[21] Appl. No.: 341,152

[22] Filed: Nov. 16, 1994

[30] Foreign Application Priority Data

Nov. 30, 1993 [JP] Japan .................. 5-068909 U

[51] Int. Cl.⁶ .................................................. H01M 2/18
[52] U.S. Cl. ...................... 429/139; 429/144; 429/225; 429/252
[58] Field of Search .................................. 429/136, 139, 429/141, 144, 252, 254, 225

[56] References Cited

U.S. PATENT DOCUMENTS

| | | | |
|---|---|---|---|
| 3,703,417 | 11/1972 | Rosa et al. | 429/139 |
| 4,448,862 | 5/1984 | Schulte et al. | 429/136 |
| 4,855,196 | 8/1989 | Eggers | 429/139 |
| 5,075,183 | 12/1991 | Yamaguchi et al. | 429/139 |
| 5,209,993 | 5/1993 | Mix | 429/136 |
| 5,384,211 | 1/1995 | Choi et al. | 429/136 |

FOREIGN PATENT DOCUMENTS 57-23868  2/1982  Japan .

*Primary Examiner*—Anthony Skapars
*Attorney, Agent, or Firm*—Breiner & Breiner

[57] ABSTRACT

A stable and durable electrode assembly for a lead-acid storage battery to provide a longer-life lead-acid storage battery is described. A synthetic resin-made separator and a glass mat, which is wider than the separator, are coordinately stacked together and then folded in such a manner that the separator is positioned within the glass mat and the side edge portions of the separator overlap and the side edge portions of the glass mat overlap. The overlapped side edge portions are respectively seal-bonded to each other to provide a pocket-type electrode assembly wherein the outer surface thereof is a pocket-type glass mat which surrounds a pocket-type separator.

12 Claims, 3 Drawing Sheets

LEAD-ACID STORAGE BATTERY CONTAINING POCKET-TYPE ELECTRODE ASSEMBLY

FIELD OF THE INVENTION

The invention is directed to a pocket-type electrode assembly for a lead-acid storage battery and a lead-acid storage battery containing the pocket-type electrode assembly. The electrode assembly includes a pocket-type separator surrounded by a pocket-type glass mat. The pocket-type separator is structured to hold an electrode plate.

BACKGROUND OF THE INVENTION

Pocket-type synthetic resin-made separators are known for use in lead-acid storage batteries. Conventional pocket-type separators are used to contain either a positive electrode plate or a negative electrode plate so that the counter-electrode plate not contained in the pocket-type separator can be stacked upon and aligned with the outer surface of the separator to provide a plate assembly which makes up at least one cell element.

However, whether a positive electrode plate is contained in the conventionally known pocket-type separator or stacked on the outer surface thereof, it has been common practice to interpose a glass mat between the synthetic resin-made separator and the positive electrode plate in order to prevent active material from flaking off the positive electrode and deterioration of the separator from oxidation by contact with oxygen generated from the positive electrode plate. Moreover, in manufacture it is difficult to insert and position the glass mat so as to properly interpose the glass mat coordinately between the positive electrode plate and the surface of the pocket-type separator. A further problem results from the fact that both side edges of the positive electrode plate are likely to contact both side edges of the synthetic resin-made separator or the immediate adjacent area thereof. As a result, the separator can have physical damage or material deterioration from oxidation which results in separator failure and shorting out of the cell.

When a negative electrode plate is placed in the pocket-type separator, it is not necessary to interpose a glass mat between the negative electrode plate and the inner surface of the separator. However, before a positive electrode plate is stacked on an outside surface of the separator, a glass mat is conventionally stacked on the outer surface of the separator and then the positive electrode plate stacked on the glass mat to provide a plate assembly. The use of the glass mat is to decrease flaking off of active material from the positive electrode and deterioration due to oxidation. It is extremely time-consuming, however, to stack these three different components, i.e., a pocket-type separator, a glass mat and a positive electrode plate, one after another in proper alignment with each other. Furthermore, it has been determined that during the stacking operation and subsequent handling operations involving the stacked plate assemblies and placement in a battery container or the like, the glass mat tends to at least partially move out of position or slip off completely making it difficult to achieve high productivity in the production of aligned stacked plate assemblies.

Japanese Kokai Utility Model Publication No. 57-23868 discloses a pocket-type synthetic resin-made separator for containing a negative electrode plate having a leaf-like glass mat bonded to the central region of an outer side of the separator. The glass mat bonded to the separator is narrower in width than the separator. This pocket-type separator can be prepared prior to alignment of an electrode to an outer surface of the separator thereby avoiding the need to stack on the outer surface of the separator a separately prepared glass mat at the time of stacking an electrode. However, disadvantages are still present with this structure. For example, both seal-bonded side edge portions of the pocket-type separator extend outward beyond both the side edges of the glass mat and, therefore, are exposed to external surroundings. These exposed or uncovered portions are likely to be damaged when hit by a stacking or other battery assembling apparatus in the course of a battery manufacturing process involving the stacking of a positive electrode plate on the pocket-type separator and placement of the formed plate assembly into a battery container to provide a storage battery. Further, as the finished battery product is relocated for use and in the course of use of the battery, the exposed side edge portions of the separator become oxidized, and thus deteriorate, resulting in the breakage and flaking off of active material from the electrode plate and the shortening of the battery's life or premature failure of the battery. Additionally, when a continuous manufacturing process is used in which a pocket-type separator and a positive electrode plate are stacked one upon another by means of a stacker to continuously produce plate assemblies, the process is often hampered due to the difference in height existing between the side edges of the pocket-type synthetic resin-made separator and the side edges of the glass mat stacked on or bonded to the outer side surface of the separator.

OBJECTS AND BRIEF DESCRIPTION OF THE INVENTION

A primary object of the present invention is to provide an improved pocket-type electrode assembly for a lead-acid storage battery free from the above mentioned disadvantages.

The pocket-type electrode assembly according to the present invention includes a synthetic resin-made pocket-type separator which is positioned within a pocket-type glass mat. The pocket-type separator is structured to contain a first electrode plate, which can be either a positive or negative electrode plate. A second electrode plate, which is a counter-electrode plate to the first electrode plate, is stacked on the outside surface of the glass mat. Preferably, the first electrode plate is a negative electrode plate and the second electrode plate is a positive electrode plate. This combined structure is used in a storage battery container with an electrolyte solution to provide a storage battery. The pocket-type electrode assembly is constructed and arranged so that both side edge portions of the separator are protected by the glass mat from external surroundings and thus have good stability and strength sufficient to prevent possible short-circuiting between negative and positive electrode plates of a plate assembly in a storage battery. Further, the electrode assembly of the invention allows for a highly efficient continuous production process of storage batteries as a result of eliminating any difference in height present between side edge portions of the separator and side edge portions of a glass mat used with the separator as in the prior art.

More specifically, the pocket-type electrode assembly of the invention is provided by layering a synthetic resin-made separator material on a glass mat, wherein the glass mat is wider than the separator material. The separator material and glass mat are folded together in such a manner that the separator material is positioned inside the glass mat and the side edge portions of the separator material and the glass mat mutually overlap with the side edge portions of the folded glass mat extending outward beyond the main body of the folded separator material. The side edge portions of the pocket-type separator and pocket-type glass mat are each individually seal-bonded together or integrally seal-bonded together. Thus, a pocket-type separator is formed in a simultaneously formed pocket-type glass mat.

Additionally, the present invention provides for a stable and durable long-life lead acid storage battery which is simple to manufacture. The storage battery includes a battery container containing at least one plate assembly composed of the above-described pocket-type electrode assembly containing a first electrode plate therein and having a second electrode plate stacked on the outer surface of the glass mat which forms the exterior of the electrode assembly. The first electrode plate is preferably a negative electrode plate and the second electrode plate is preferably a positive electrode plate.

Due to the presence of the pocket-type glass mat around the pocket-type separator as described above, the pocket-type electrode assembly for a lead acid storage battery according to the present invention not only prevents the flaking off of active material from a positive electrode plate stacked on the outer surface of the glass mat, but also insures a battery of longer life since the outer surfaces of the seal-bonded side edge portions of the pocket-type separator are covered by, and thus protected by, the seal-bonded side edge portions of the pocket-type glass mat. This structure prevents the synthetic resin-made separator from direct contact with external surroundings and, as a result, prevents damage which could otherwise be caused which leads to the flaking off of active material from both side edge portions and thus short-circuiting of the battery. Another advantage is that the pocket-type electrode assembly according to the present invention has its side edges double-sealed, one inside the other, so that the mechanical strength of the assembly is increased. Further, in view of the structure of the assembly, no difference in height between the side edge portions of the pocket-type separator and the pocket-type glass mat exists which allows for operation of a continuous and efficient manufacturing process using a stacker in the production of plate assemblies.

In one embodiment according to the present invention with regard to sealing of the side edge portions, both side edge portions of the folded glass mat are seal-bonded at the portions of the glass mat which extend beyond the outer surfaces of the side edge portions of the folded separator which it overlaps, while the overlapping side edge portions of the separator are also seal-bonded together. Alternatively, the side edge portions of the pocket-type separator and the side edge portions of the pocket-type glass mat which overlap can be seal-bonded together at the point of mutual overlapping as well as being seal-bonded at their respective side edge portions. This integral or unified structure is advantageous in that it provides the pocket-type separator of the present invention with increased overall stability and strength.

A lead-acid storage battery according to the present invention uses the above-described pocket-type electrode assembly having the side edge portions thereof double-sealed so that electrical insulation is improved between the electrode plate contained in the pocket-type separator and the electrode plate stacked on the outer surface of the pocket-type glass mat, thus protecting the battery from short-circuiting. As a result, the lead-acid storage battery according to the present invention is capable of providing a more stable and trouble-free performance over a longer period of time.

Figure 1:
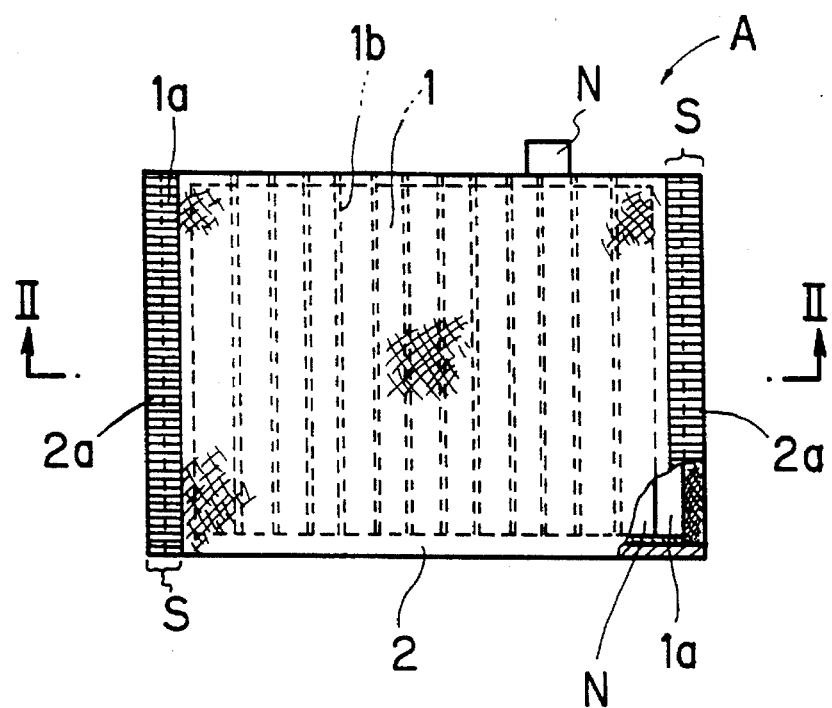
FIG. 1 is a front view of one embodiment of a pocket-type electrode assembly for use in a lead-acid storage battery according to the present invention.

A—Pocket-type electrode assembly according to the present invention including a pocket-type separator surrounding an electrode plate, and a pocket-type glass mat surrounding the separator;

1—Pocket-type synthetic resin-made separator;

1a, 1a—Side edge portions of the synthetic resin-made separator;

1b—rib;

2—Pocket-type glass mat for enclosing a pocket-type separator;

2a, 2a—Side edge portions of the pocket-type glass mat;

3—Jointly bonded side edge portions of the inside pocket-type synthetic resin-made separator and the outside pocket-type glass mat;

4—Plate assembly;

5—Battery container;

6—Lead-acid storage battery according to the present invention;

S—Bonding portions of the pocket-type glass mat having a width which overlaps the outer surfaces of both side edge portions of the synthetic resin-made separator to provide mutually overlapped side edge portions extending beyond the main body of the separator;

N—Negative electrode plate; and

P—Positive electrode plate.

DESCRIPTION OF PRESENTLY PREFERRED EMBODIMENTS

Examples of preferred embodiments of the present invention are described below with reference to the drawing. It is noted that preferably the electrode plate contained within the separator is a negative electrode plate and, accordingly, a positive electrode plate is stacked in alignment with the outer surface of the pocket-type glass mat surrounding the pocket-type separator. For ease of description, the invention will be described below with regard to this preferred arrangement. However, it is recognized that the position of the respective electrode plates can be reversed.

Figure 2:
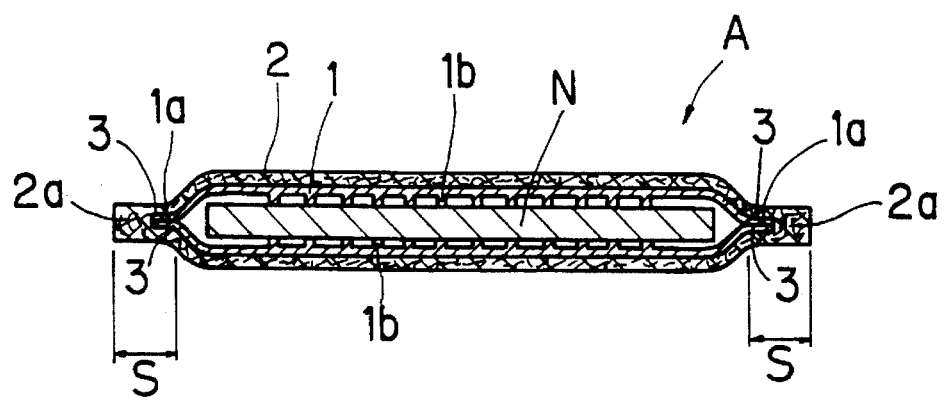
FIG. 2 is a cross-sectional view taken along line II—II of FIG. 1.

In FIGS. 1 and 2, A illustrates a pocket-type electrode assembly for a lead-acid storage battery according to the present invention containing a negative electrode plate N. The pocket-type electrode assembly A includes a pocket-type microporous synthetic resin-made separator 1 and a pocket-type glass mat 2 surrounding the outer surface of the synthetic resin-made separator 1, thus providing a double-pocket structure. The pocket-type synthetic resin-made separator 1 is generally made of an acid-resisting synthetic resin, preferably a super molecular-weight polyolefin resin, such as polyethylene or the like. Since the pocket-type synthetic resin-made separator 1 is enclosed within with an outer layer formed by the pocket-type glass fiber mat 2, it is easy and simple to produce a stacked plate assembly, i.e., a positive electrode plate is simply stacked on the outer surface of electrode assembly A. This arrangement prevents the synthetic resin-made separator 1 from deteriorating due to oxidation that would take place if separator 1 came into direct contact with the positive electrode plate. At the same time, the structure of the invention substantially insures that no active material will flake off the positive electrode plate which is attached under pressure to the pocket-type glass mat 2. Furthermore, the pocket-type electrode assembly A has, as described below, both side edges double seal-bonded thereby increasing the mechanical strength and preventing short-circuiting at the side edge portions. Accordingly, a stable, durable, longer-life storage battery is provided by using the abovedescribed pocket-type electrode assembly according to the present invention.

In the above-described example, the pocket-type glass mat 2 can be a sheet made of glass fiber alone or of a mixture of glass fiber and synthetic fiber. When the glass mat is made of a mixture of glass fiber and synthetic fiber, the side edge portions thereof can be seal-bonded by a mechanical seal, as well as by a heat seal or ultrasonic seal. Additionally, the pocket-type glass mat can be bonded to the outer surfaces of both side edge portions of the pocket-type synthetic resin-made separator forming the inner layer of the present invention electrode assembly by heat sealing or ultrasonic sealing, so that the mechanical strength of the pocket-type electrode assembly of the present invention can be increased by bringing the inner pocket-type synthetic resin-made separator and the outer pocket-type glass mat together integrally with each other.

More particularly, the above-mentioned pocket-type electrode assembly A for a lead-acid storage battery is constructed and arranged so that seal-bonded portions 1a, 1a of both side edge portions of the pocket-type synthetic resin-made separator 1 are covered with seal-bonded portions 2a, 2a of both side edge portions of the pocket-type glass mat. The pocket-type electrode assembly A thus provides better protection against possible damage as can be caused by outside contacts, frictions, and the like that occur during a manufacturing process in which a positive electrode plate is stacked on the outer surface of the electrode assembly A or when the assembly A is being moved or put with an electrode plate into a battery container as a plate assembly. The electrode assembly of the invention also protects against contact with nascent oxygen generated during charge and discharge operations of the storage battery which could serve to deteriorate the separator 1. As a result, the electrode assembly of the invention is free from the disadvantages as described above as being present in conventional separators including physical damage, deterioration by oxidation of the side edge portions of the separator, and breakage thereof which causes flaking off of active material as well as short-circuiting of the positive electrode plate, all of which combine to shorten the life of a battery. Thus, the pocket-type electrode assembly A according to the present invention is easier to handle and provides a longer service life. In addition, since the electrode assembly A of the present invention has no difference in height on the outer surfaces of its side edge portions, a continuous production process involving the stacking on the assembly of a positive electrode plate proceeds smoothly and efficiently.

Figure 3:
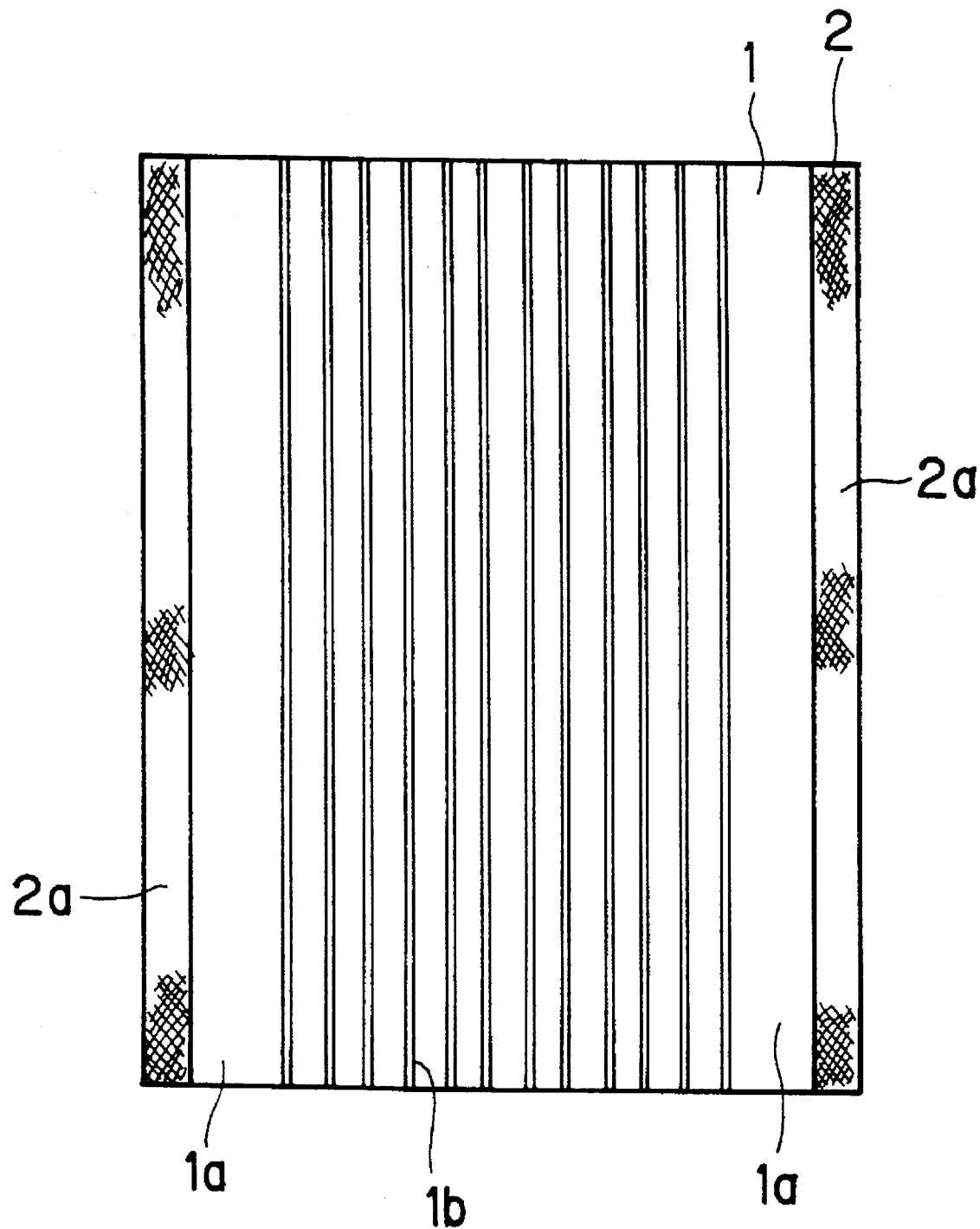
FIG. 3 is front view of a pocket-type electrode assembly according to the present invention during production prior to folding.

The manufacture of a pocket-type electrode assembly A of the invention as shown FIGS. 1 and 2 is shown in FIG. 3. A synthetic resin separator 1, made preferably of a microporous polyethylene (PE) film or the like, is stacked on the central region of the upper surface of a glass mat 2, which is larger in width than the separator 1, so that both side edge portions 2a, 2a of the glass mat 2 extend outward beyond both side edge portions 1a, 1a of the synthetic resin-made separator 1 to provide a margin of desired width. These two sheets thus stacked in layers are folded in half so that the synthetic resin-made separator 1 is positioned inside the glass mat 2 and both side edge portions 1a, 1a overlap with and face each other and both side edge portions 2a, 2a overlap with and face each other. The side edge portions are seal-bonded together, respectively, by mechanical sealing, heat sealing or ultrasonic sealing to thereby produce a pocket-type electrode assembly A for a lead-acid storage battery as shown in FIGS. 1 and 2. As a result, the pocket-type electrode assembly A according to the present invention features a double pocket-type structure including pocket-type synthetic resin-made separator 1 of which the outer surfaces are covered entirely by the pocket-type glass mat 2, and double seal-bonded side edge portions. The structure provides for improved mechanical strength. In the drawing, 1b denotes a rib.

As described above, the glass mat used in constructing a pocket-type electrode assembly A for a lead-acid storage battery can be made either composed of glass fibers alone or a mixture of glass fibers and synthetic fibers. In general, a conventional glass mat or retainer mat commercially available can be used. Most conventional glass mats are mainly composed of glass fibers partially mixed with synthetic fibers. Any one of these known glass mats can be selectively used either for an open-type or sealed-type lead-acid storage battery depending on the purpose or use.

A specific example of a glass mat suitable for use is a glass fiber mat made of glass fibers having an average fineness of about 1.9 µm in diameter and manufactured by either a dry or wet-type sheet making process. A glass mat suitable for use as a retainer mat can be one made of a mixture of glass fibers and acid-resisting synthetic fibers manufactured so that the fine glass fibers have an average fineness of 0.5–5 µm in diameter and are mixed with acid resisting synthetic fibers, such as polyethylene terephthalate fibers amounting to 30%, and made into a sheet by either a dry or wet sheet making process. Thus, a pocket-type electrode assembly A according to the present invention can have its outer surface composed of a pocket-type glass mat capable of serving as a retainer mat that absorbs and retains an electrolyte solution.

Particularly when the glass mat is made of mixed fibers, the overlapping side edge portions 2a, 2a of the glass mat can be seal-bonded to each other not only by means of a mechanical or gear sealing apparatus, but also by means of heat sealing or ultrasonic sealing apparatus which are generally more convenient. When the bonding portions of side edge portions 2a, 2a of the folded glass mat 2 are so wide, such as shown by the bonding portion range S, that they overlap with the outer surfaces of both side edge portions 1a, 1a of the folded separator 1, both side edge portions 2a, 2a can be seal-bonded to each other at their mutually overlapping side edge marginal portions and at the same time bonded to the outer surfaces of both side edge portions 1a, 1a of the synthetic resin-made separator. This results in obtaining a preferred pocket-type electrode assembly A provided with integrally seal-bonded portions 3 as indicated in FIG. 2. The bonded portions 3 provide the electrode assembly A with increased stability and thus increased durability.

Figure 4:
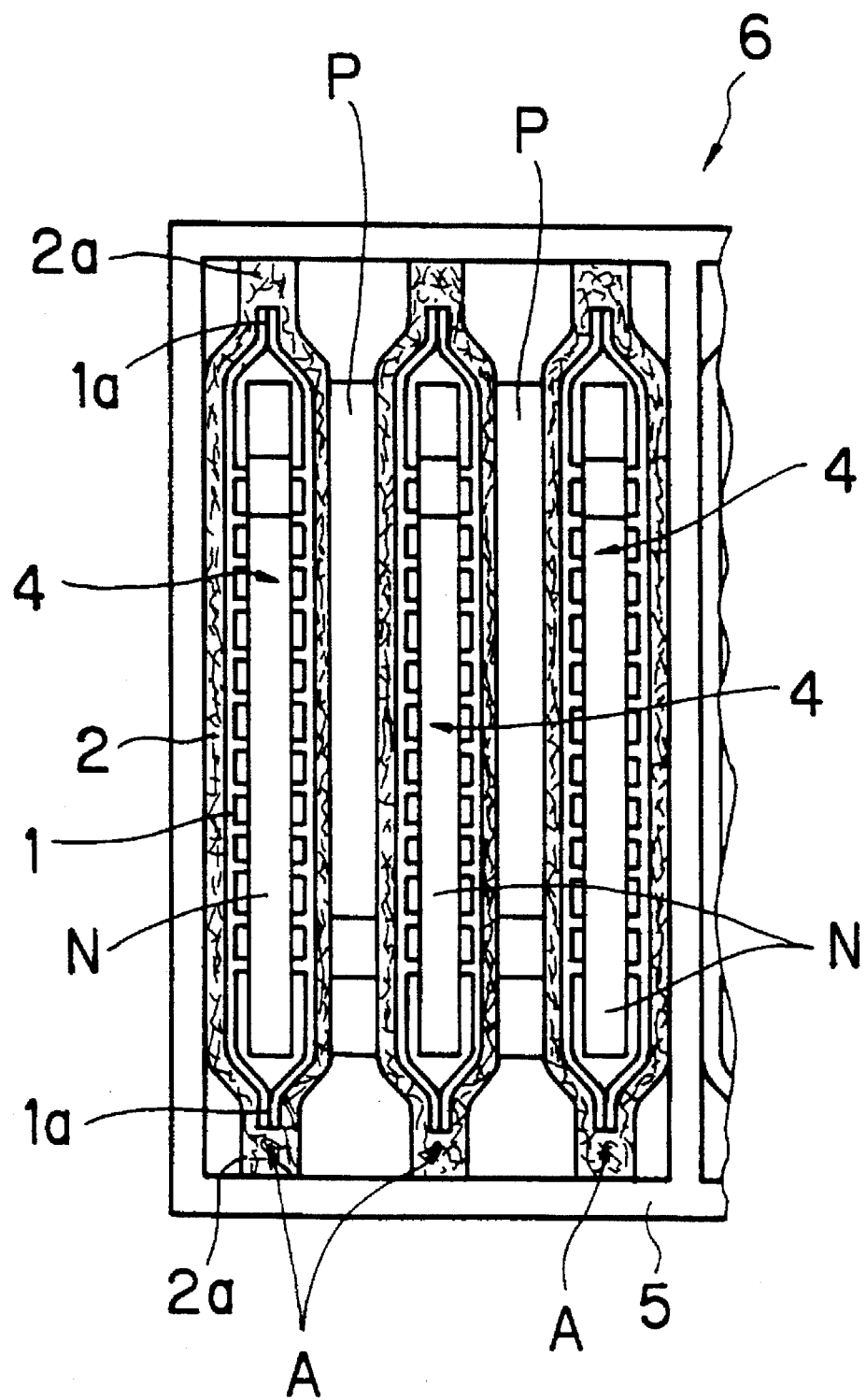
FIG. 4 is a partial cross-sectional top view of one embodiment of a lead-acid storage battery according to the present invention.

The above-described pocket-type electrode assembly A according to the present invention is preferably used to contain a negative electrode plate N. A positive electrode plate P is stacked upon the glass mat 2 formed as the outer layer of the electrode assembly A. A plate assembly 4 including a desired number of cell elements is constructed using the electrode assembly of the invention and electrode plates N and P. A plate assembly 4 is put in each cell chamber of a battery container 5 as shown in FIG. 4 and a sulfuric acid electrolyte solution poured into each cell chamber. A battery cover is then applied and fixed to the container in a conventional manner to obtain a lead-acid storage battery according to the present invention.

For comparison, a conventional lead-acid storage battery was manufactured using a conventional pocket-type synthetic resin-made separator made of the same material as the separator of the above described invention. Further, a negative electrode plate and a positive electrode plate identical to the plates used in the above-described example of the invention were used. The negative electrode plate was contained in the conventional separator. The positive electrode plate was stacked upon the outer surface of the conventional separator with a leaf-like glass mat interposed therebetween to provide a plate assembly including the same number of cell elements as the above-described example of the invention. A plate assembly thus prepared was placed in each of the cell chambers of a battery container of the same type as described above in relation to the invention with the same amount of the same sulfuric acid electrolyte solution poured in each of the cell chambers. An identical battery cover was applied and affixed to the container.

The life of the lead-acid storage battery according to the invention and the comparative storage battery was tested in accordance with standard test protocol JIS D 5301. The test results showed that when the number of charge-discharge cycles obtained with the conventional lead-acid storage battery made for comparison was taken as 100%, that the number of charge-discharge cycles obtained with the lead-acid storage battery made according to the present invention amounted to 113%. Thus, a significant increase in life performance was demonstrated in the storage battery of the invention.

As will be apparent to one skilled in the art, various modifications can be made within the scope of the aforesaid description. Such modifications being within the ability of one skilled in the art form a part of the present invention and are embraced by the appended claims.

It is claimed:

1. An electrode assembly for a lead-acid storage battery comprising a synthetic resin-made separator with side edge portions and a glass mat with side edge portions, wherein the glass mat is wider than the synthetic resin-made separator, and wherein the separator and the glass mat are stacked one upon another and folded so that the separator is positioned within the glass mat, the side edge portions of the separator overlap, and the side edge portions of the glass mat overlap each other and extend beyond the side edge portions of the separator, with the side edge portions of the separator and the side edge portions of the glass mat respectively being at least individually seal-bonded to each other.

2. An electrode assembly for a lead-acid storage battery according to claim 1 wherein the side edge portions of the glass mat following folding and the side edge portions of the separator following folding are bonded together so that the separator and the glass mat are made integral with each other.

3. A separator for a lead-acid storage battery according to claim 1 wherein the glass mat is composed of glass fiber alone.

4. A separator for a lead-acid storage battery according to claim 2 wherein the glass mat is composed of glass fiber alone.

5. A separator for a lead-acid storage battery according to claim 1 wherein the glass mat is composed of a mixture of glass fiber and synthetic fiber.

6. A separator for a lead-acid storage battery according to claim 2 wherein the glass mat is composed of a mixture of glass fiber and synthetic fiber.

7. A lead-acid storage battery comprising a battery container, a plate assembly, and an electrolyte solution, wherein said plate assembly comprises a first electrode plate contained in an electrode assembly according to claim 1, and a second electrode plate which is a counter-electrode plate to said first electrode plate and is stacked on an outer surface of the electrode assembly.

8. A lead-acid storage battery comprising a battery container, a plate assembly, and an electrolyte solution, wherein said plate assembly comprises a first electrode plate contained in an electrode assembly according to claim 2, and a second electrode plate which is a counter-electrode plate to said first electrode plate and is stacked on an outer surface of the electrode assembly.

9. A lead-acid storage battery according to claim 7 wherein the first electrode plate is a positive electrode plate and the second electrode plate is a negative electrode plate.

10. A lead-acid storage battery according to claim 7 wherein the first electrode plate is a negative electrode plate and the second electrode plate is a positive electrode plate.

11. A lead-acid storage battery according to claim 8 wherein the first electrode plate is a positive electrode plate and the second electrode plate is a negative electrode plate.

12. A lead-acid storage battery according to claim 8 wherein the first electrode plate is a negative electrode plate and the second electrode plate is a positive electrode plate.

* * * * *